US007364607B2

(12) United States Patent
Ueda et al.

(10) Patent No.: US 7,364,607 B2
(45) Date of Patent: Apr. 29, 2008

(54) WROUGHT FIBER SHEET AND FILTER UNIT

(75) Inventors: Kazuhiro Ueda, Ohtsu (JP); Toyota Seki, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 88 days.

(21) Appl. No.: 10/515,277

(22) PCT Filed: May 19, 2003

(86) PCT No.: PCT/JP03/06232

§ 371 (c)(1),
(2), (4) Date: Nov. 22, 2004

(87) PCT Pub. No.: WO03/097212

PCT Pub. Date: Nov. 27, 2003

(65) Prior Publication Data

US 2005/0172812 A1 Aug. 11, 2005

(30) Foreign Application Priority Data

May 20, 2002 (JP) ............................ 2002-144953
Jun. 11, 2002 (JP) ............................ 2002-170285

(51) Int. Cl.
*B03C 3/28* (2006.01)

(52) U.S. Cl. ............................ 96/67; 55/497; 55/499; 55/521; 55/528; 55/DIG. 5; 55/DIG. 31; 55/DIG. 39; 428/297.4; 428/395

(58) Field of Classification Search ................. 55/497, 55/499, 521, 527–528, DIG. 5, DIG. 39, 55/DIG. 31; 96/67; 128/206.16; 428/297.4, 428/395

See application file for complete search history.

(56) References Cited

U.S. PATENT DOCUMENTS 5,167,740 A * 12/1992 Michaelis et al. ......... 156/73.1
5,298,602 A * 3/1994 Shikinami et al. .......... 528/361
5,645,057 A * 7/1997 Watt et al. ............. 128/206.12
5,941,244 A * 8/1999 Yamazaki et al. ..... 128/206.19
5,997,991 A * 12/1999 Kato et al. .................. 428/182
6,322,615 B1 * 11/2001 Chapman ....................... 96/67
6,428,610 B1 * 8/2002 Tsai et al. ...................... 96/15
6,491,743 B1 * 12/2002 Joannou et al. ................ 96/67
6,497,754 B2 * 12/2002 Joannou ........................ 96/67
6,645,618 B2 * 11/2003 Hobbs et al. ............... 428/359

(Continued)

FOREIGN PATENT DOCUMENTS

EP 0765959 A1 4/1997

(Continued)

OTHER PUBLICATIONS

Supplemental European Search Report dated Jul. 6, 2005.

*Primary Examiner*—Richard L. Chiesa
(74) *Attorney, Agent, or Firm*—Morrison & Foerster LLP

(57) ABSTRACT

A wrought fiber sheet or air cleaning filter unit that exhibits high performance and is biodegradable so as to enable reducing load upon environment. The wrought fiber sheet is produced by coupling biodegradable fiber sheets having electret properties by means of a configuration reinforcing member of a biodegradable material. Further, the frame for accommodating the wrought fiber sheet is also constituted of a biodegradable member so as to obtain an air cleaning filter unit that exerts biodegradability as a whole.

11 Claims, 2 Drawing Sheets

U.S. PATENT DOCUMENTS

| | | | | |
|---|---|---|---|---|
| 6,890,649 | B2 * | 5/2005 | Hobbs et al. | 428/365 |
| 2002/0192449 | A1 * | 12/2002 | Hobbs et al. | 428/297.4 |
| 2004/0058140 | A1 * | 3/2004 | Hobbs et al. | 428/292.1 |

FOREIGN PATENT DOCUMENTS

| | | |
|---|---|---|
| JP | 64-63012 | 3/1989 |
| JP | 04-290997 | 10/1992 |
| JP | 5-152638 A | 6/1993 |
| JP | 09-173748 | 7/1997 |
| JP | 10-202025 | 8/1998 |
| JP | 10-310968 | 11/1998 |
| JP | 11-42732 | 2/1999 |
| JP | 11-104416 | 4/1999 |
| JP | 2000-084333 A | 3/2000 |
| JP | 2001-146672 | 5/2001 |
| JP | 2002-336629 | 11/2002 |

* cited by examiner

【FIG. 1】
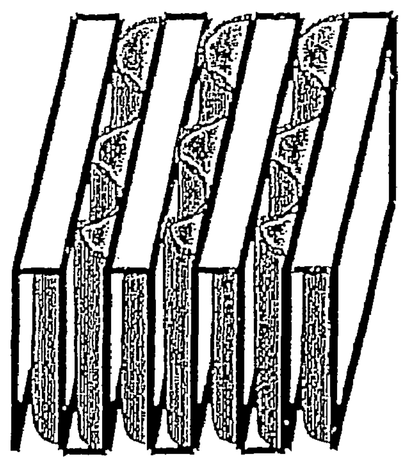
【FIG. 2】
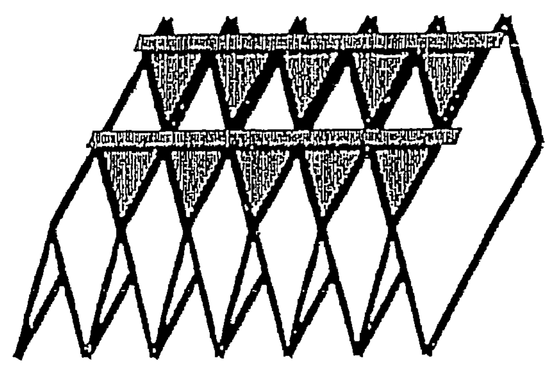
【FIG. 3】
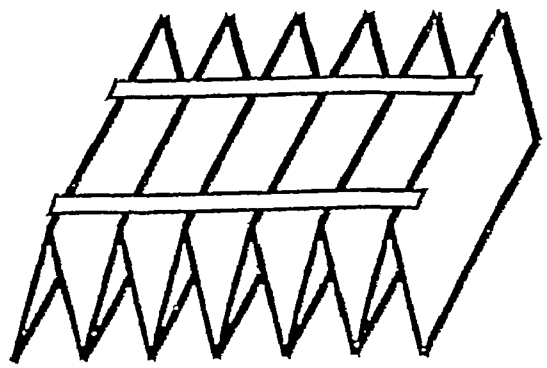

【FIG.4】
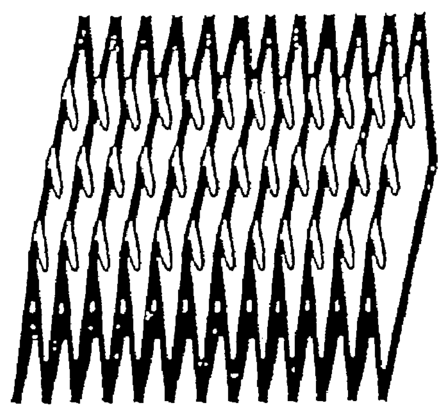
【FIG.5】
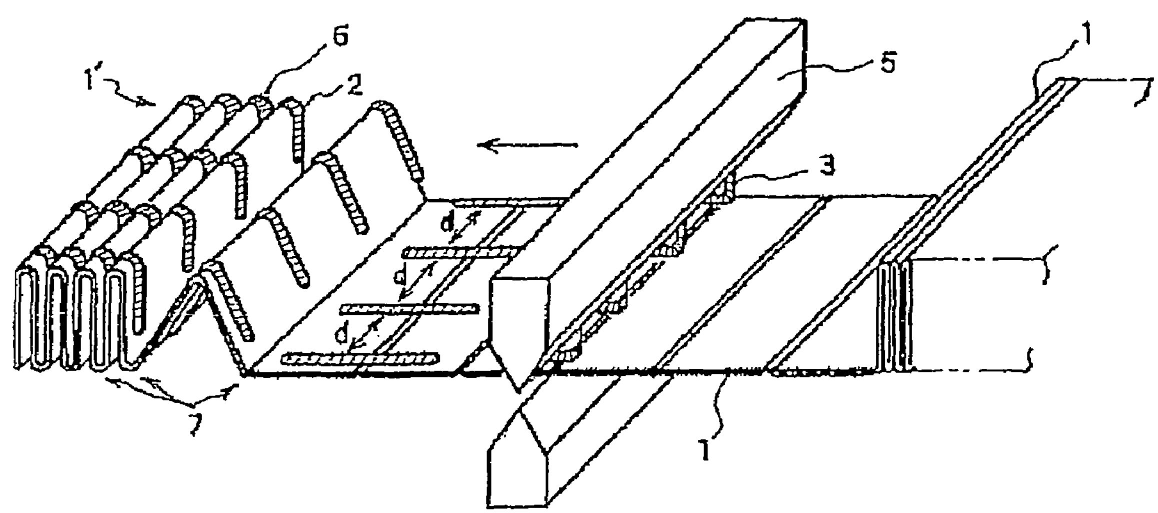

WROUGHT FIBER SHEET AND FILTER UNIT

FIELD OF THE INVENTION

The present invention relates to a wrought fiber sheet obtained by coupling an electret fiber sheet capable of removing a dust in the air with a low pressure loss, with a biodegradable configuration reinforcing member, which can be subjected to biodegradation treatment, and is suitable for mounting in an equipment requiring energy saving or low noise, and an air cleaning filter unit obtained by incorporating a wrought fiber sheet into a biodegradable frame member.

BACKGROUND ART

Previously, as a member for reinforcing a shape of a fiber sheet, a separator having a corrugated shape or the like has been devised in JP-A No. 4-290997 and JP-A No. 2002-336629, and a wrought fiber sheet with a comb-like separating material inserted therein has been devised in JP-A No. 9-173748. However, since as a separating material used in the previous configuration reinforcing member, a metal such as aluminum and the like, and olefin-based, polyamide-based, synthetic rubber-based and urethane-based resins are used, and since these reinforcing members are not biodegradable, there was a problem in that, even when a fiber sheet part is degraded, a reinforcing member is hardly degraded. Further, a method for crosslinking-fixing a hot melt resin at an apex of a pleat shape has been devised in JP-A No. 64-63012 gazette. However, the method had a problem in that the hot melt resin is a resin such as copolymerized polyamide, ethylene-vinyl acetate copolymer, polyolefin or the like, and is not biodegradable like the aforementioned separating material.

Similarly, as a frame member for accommodating a wrought fiber sheet, a non-combustible material, for example, a metal such as aluminum and the like, and olefin-based, polyamide-based, synthetic rubber-based, and urethane-based resins are used. Since these frame materials are not biodegradable, there was a problem in that, even when a wrought fiber sheet is degraded, a frame material is hardly degraded.

OBJECT AND SUMMARY OF THE INVENTION

In view of the aforementioned circumstances, in the present invention, when a frame material and a wrought fiber sheet are not integrated, by coupling with a member for reinforcing a shape of an electret fiber sheet and adopting a biodegradable material in both of them, a biodegradable wrought fiber sheet having a high dust removing performance with a low pressure loss is obtained. In this case, it becomes possible to exchange only a wrought fiber sheet while continuing to use a frame material.

On the other hand, when a frame material and a wrought fiber sheet are integrated, by adopting a biodegradable material in both of the wrought fiber sheet and the frame material, a biodegradable air cleaning filter unit having a high dust removing performance with a low pressure loss is obtained. The present invention provides a wrought fiber sheet and an air cleaning filter unit which have high performance property and can reduce a load on the environment.

SUMMARY OF THE INVENTION

That is, the present invention has the following essential features:

The present invention is a wrought fiber sheet characterized in that a biodegradable electret fiber sheet is coupled with a configuration reinforcing member comprising a biodegradable material.

In addition, a preferable embodiment of the present invention is the wrought fiber sheet, wherein the biodegradable electret fiber sheet has a pleated shape.

In addition, a preferable embodiment of the present invention is the wrought fiber sheet, wherein the configuration reinforcing member for a biodegradable electret fiber sheet comprises a resin plate, a hot melt resin, or a fiber sheet having higher rigidity than that of the biodegradable electret fiber sheet.

In addition, a preferable embodiment of the present invention is the wrought fiber sheet, wherein the hot melt resin for a configuration reinforcing member has a softening point which is 90° C. or higher, in measurement based on JIS-K-6863, and is lower than a melting point of a fiber sheet by 10° C. or more.

In addition, a preferable embodiment of the present invention is the wrought fiber sheet, wherein as a resin plate for a configuration reinforcing member, polylactic acid in which an optical purity of L-lactic acid and D-lactic acid as an optical isomer is 70% ee or higher is used.

In addition, a preferable embodiment of the present invention is the wrought fiber sheet, wherein the biodegradable electret fiber sheet is a fiber sheet containing aliphatic polyester as a main component.

In addition, the present invention is an air cleaning filter unit characterized in that a wrought fiber sheet obtained by coupling a configuration reinforcing member comprising a biodegradable material with a biodegradable electret fiber sheet, is integrated with a biodegradable frame member for accommodating the sheet.

In addition, a preferable embodiment of the present invention is the air cleaning filter unit, wherein the biodegradable electret fiber sheet has a pleated shape.

In addition, a preferable embodiment of the present invention is the air cleaning filter unit, wherein the configuration reinforcing member for a pleat-processed biodegradable electret fiber sheet comprises a resin plate or a hot melt resin.

In addition, a preferable embodiment of the present invention is the air cleaning filter unit, wherein the hot melt resin for a configuration reinforcing member has a softening point which is 90° C. or higher, in measurement based on JIS-K-6863, and is lower than a melting point of a fiber sheet by 10° C. or more.

In addition, a preferable embodiment of the present invention is the air cleaning filter unit, wherein as a resin plate for a configuration reinforcing member, polylactic acid in which an optical purity of L-lactic acid and D-lactic acid as an optical isomer is 70% ee or higher is used.

In addition, a preferable embodiment of the present invention is the air cleaning filter unit, wherein the biodegradable electret fiber sheet is a fiber sheet containing aliphatic polyester as a main component.

In addition, a preferable embodiment of the present invention is the air cleaning filter unit, wherein the frame material for accommodating a biodegradable electret fiber sheet comprises at least two sides or four sides, has higher rigidity than that of a biodegradable electret fiber sheet, and is a resin plate or a non-woven fabric.

In addition, a preferable embodiment of the present invention is the air cleaning filter unit, wherein as the frame material for a resin plate, polylactic acid in which an optical purity of L-lactic acid and D-lactic acid as an optical isomer is 70% ee or higher is used.

In addition, a preferable embodiment of the present invention is the air cleaning filter unit, wherein as the frame material for a resin plate, a polymer in which polylactic acid and polybutylene succinate or polybutylene succinate adipate are mixed at a weight ratio of 5:1 to 1:1 is used.

PREFERRED EMBODIMENTS OF THE INVENTION

It is necessary that a biodegradable electret fiber sheet used in the present invention contains aliphatic polyester as a main component. It is preferable that aliphatic polyester is polylactic acid and/or a thermoplastic resin containing polylactic acid as a main component. As a thermoplastic resin containing polylactic acid as a main component, a resin in which lactic acid is copolymerized with one kind or two or more kinds of cyclic lactones such as ε-caprolactone, α-oxyacids such as α-hydroxybutyric acid, α-hydroxyisobutyric acid and α-hydroxyvaleric acid, glycols such as ethylene glycol, and 1,4-butanediol, and dicarboxylic acids such as succinic acid and sebacic acid can be used. As a copolymer, a random copolymer and/or a block copolymer can be used. In addition, it is preferable to esterification-treat an end of a polymer molecule with a compound having a carboxyl group at a molecular end, thereby, stability at thermal molding can be improved.

A process for preparing a fiber sheet and a form of the sheet are not particularly limited, but a fiber may be either of a short fiber or a long fiber. As its aggregated form, various forms such as a woven fabric, a knitted fabric and a non-woven fabric can be used, and a spun bonded non-woven fabric, a spun lace non-woven fabric, a melt blown non-woven fabric and a film split non-woven fabric are more preferable. Further, as a section of a fiber, various shapes such as a circle, a triangle, a rectangle and an irregular shape can be used. As a fiber diameter, 100 μm or smaller, preferably 0.1 to 100 μm, particularly preferably 0.5 to 70 μm can be used because a fiber having such a diameter is easily prepared, and is suitable for use as an air cleaning filter. In addition, as a weight of a sheet comprising a fiber, 1 to 200 g/m$^2$, preferably 5 to 100 g/m$^2$, further preferably 10 to 50 g/m$^2$ can be used because low pressure loss is possible, and such the weight is advantageous in the cost.

Examples of a method of converting the fiber sheet, for example, a non-woven fabric into an electret include corona charging, electric field charging, hot electric field charging and electron beam irradiation, being not limiting. As far as a charge is stably retained at a high charge amount, other charging method may be used. When the method is performed by corona charging or electric field charging, an electric field intensity of 10 kV/cm or greater is preferable, and an electric field intensity of 15 kV/cm or greater is further preferable. In the case of electron beam irradiation, irradiation at around 0.1 to 1 Mrad is preferable.

For improving rigidity of a biodegradable electret fiber sheet, there is a method of laminating biodegradable sheets. As a biodegradable sheet, there are biodegradable sheets having breathability such as a fiber sheet and a net comprising polylactic acid, aliphatic polyester, lactone resin, starch/polyvinyl alcohol, polyhydroxyalkanoate, polyamino acid or cellulose. When an adhesive is used at lamination, it is preferable to use a biodegradable adhesive. When a biodegradable sheet has a lower melting point than that of an electret fiber sheet, lamination can be performed by heat treatment using no adhesive such as thermal roll and thermal embossing utilizing a difference in a melting point.

A wrought fiber sheet is such that a biodegradable electret fiber sheet is coupled with a configuration reinforcing member, and examples of a shape of a biodegradable fiber sheet include a single plate shape and a pleated shape.

As a biodegradable electret fiber sheet, a continuous sheet is preferably used. An electret fiber sheet is molded into a pleated shape by bending at an appropriate interval in its longitudinal direction. An interval at which the sheet is bent in the longitudinal direction is arbitrary, and can be determined depending on its utility, a thickness of an electret fiber sheet, and a configuration reinforcing member.

Examples of a configuration reinforcing member for a biodegradable electret fiber sheet include a resin plate comprising a biodegradable material, a molded piece of a resin plate, a hot melt resin, and a biodegradable fiber sheet having higher rigidity than that of a biodegradable electret fiber sheet.

Although it is effective that a resin plate for a configuration reinforcing member contains aliphatic polyester as a main component, a material having biodegradability, and having strength and processibility equivalent to those of a resin plate may be used. It is preferable that aliphatic polyester is polylactic acid and/or a thermoplastic resin containing polylactic acid as a main component. As a thermoplastic resin containing polylactic acid as a main component, resins in which lactic acid is copolymerized with one kind or two or more kinds of cyclic lactones such as ε-caprolactone, α-oxyacids such as α-hydroxybutyric acid, α-hydroxyisobutyric acid, and α-hydroxyvaleric acid, glycols such as ethylene glycol, and 1,4-butanediol, and dicarboxylic acids such as succinic acid and sebacic acid can be used. As a copolymer, a random copolymer and/or a block copolymer can be used. In addition, it is preferable to esterify an end of a polymer molecule with a compound having a carboxyl group at a molecular end, whereby, stability at thermal molding can be improved.

Polylactic acid is a dehydration polycondensate of lactic acid. Polylactic acid having a high molecular weight is easily obtained via lactide which is a cyclic dimer of lactic acid. In lactic acid, there are L-lactic acid and D-lactic acid which are an optical isomer. It is known that an optical purity or crystallizability of polylactic acid is different depending on a ratio of L-isomer and a D-isomer present in its molecular structure. Regarding mechanical property, an elastic modulus and an elongation have no dependency on an optical purity. There is a tendency that as an optical purity is lower, a strength is lower. A rate of biodegradability becomes higher as an optical purity is decreased. As a result of extensive result, when polylactic acid in which an optical purity of L-lactic acid and D-lactic acid as an optical isomer is 70% ee or higher is used, a strength equivalent to or higher than that of the previous member using aluminum, timber or ABS resin was exhibited. It is more preferable to use polylactic acid in which an optical purity of L-lactic acid and D-lactic acid as an optical isomer is 80% ee or higher. When an optical purity is 70% ee or smaller, a strength becomes smaller than that of the previous aluminum, timber or ABS resin, and function of maintaining a filtering material shape which is originally possessed by a frame material or a member can not be exerted (% ee: % enantiomeric excess).

A thickness of a resin plate of a configuration reinforcing member is associated with rigidity of a biodegradable material, and is 0.1 mm or larger, more preferably 0.2 mm or larger. When a thickness is less than 0.1 mm, a strength is deficient, and there is a possibility that configuration reinforcement is insufficient.

Examples of a shape of a resin plate for a configuration reinforcing member include a corrugated shape, a comb shape, and a straight shape. When a biodegradable electret fiber sheet has a pleated shape, there are a method of inserting a separator molded into a corrugated shape between pleats (FIG. 1), a method of inserting a stabilizer molded into a comb shape between pleats (FIG. 2), and a method of adhering a liner molded into a straight shape at a pleat apex. On the other hand, when a biodegradable electret fiber sheet has a single plate shape, the sheet may be also applied to an interior other than a periphery, depending on a method of applying on surrounding four sides or two sides, a size of a single plate shape, and a strength of a biodegradable electret fiber sheet. Regardless of the shape of a biodegradable electret fiber sheet, it is preferable to apply a resin plate to a biodegradable electret fiber sheet with a biodegradable adhesive.

A biodegradable hot melt resin for a configuration reinforcing member is a composition containing aliphatic polyester obtained, for example, by polycondensation—reacting aliphatic dicarboxylic acid or acid anhydride thereof, or a diester thereof, and aliphatic dicarboxylic acid having an alkyl group or an alkenyl group on a side chain, or acid anhydride thereof, or a diester thereof, and aliphatic glycol in the presence of a catalyst. This resin itself has biodegradability, and has property of excellent adherability.

As a method of adjusting a softening point, a viscosity and the like of a hot melt resin, for example, there are a method of controlling a molecular weight, a method of selecting a kind of a wax to be used, and a method of adjusting an amount to be mixed therein.

A hot melt resin is generally heated and melted at a temperature which is higher than its softening point by 20° C. or more, and is discharged through a nozzle or the like at coating. Thereupon, a temperature of a melted hot melt resin is lowered by about 10 to 30° C. at coating, due to adiabatic dilation effect by discharging, and cooling effect until coating on a fiber sheet.

Then, when a hot melt resin having a softening point which is lower than a melting point of a biodegradable electret fiber sheet by 10° C. or more is used, a temperature of a hot melt resin when coated on a fiber sheet can be lower than a melting point of a fiber sheet, thereby, melting of a filtering material due to coating of a hot melt resin can be prevented.

It is preferable that an amount of a hot melt resin used per configuration reinforcing member which is formed by coating of a hot melt resin is 1 to 10 g/m. In the case of less than 1 g/m, the reinforcing effect of the reinforcing member becomes insufficient. On the other hand, when the amount exceeds 10 g/m, a surface part of the hot melt resin discharged through a nozzle is cooled by contact with the air. However, a temperature of the interior which is not contacted with the air is not lowered as much, and a temperature higher than the melting point of the fiber sheet is maintained. For this reason, there arises a possibility that the fiber sheet is melted at coating of a hot melt resin. Under such a condition, it is desirable that a width of a resin which is coated in a linear manner is not smaller than 0.5 mm and not larger than 5 mm.

When a softening point of a hot melt resin is lower than 90° C., coating can be performed without melting a biodegradable electret fiber sheet, but the resulting wrought fiber sheet is inferior in heat resistance, being not preferable.

In the present invention, a melt viscosity of a hot melt resin at 150° C. is preferably not lower than 2,000 centipoises and not larger than 20,000 centipoises, more preferably not smaller than 3,000 centipoises and not larger than 15,000 centipoises. When a melt viscosity is less than 2,000 centipoises, a coated hot melt resin is spread in a planer manner, and a separating material having a sufficient height can not be obtained. Further, since a hot melt resin is permeated between fibers of a fiber sheet due to capillary phenomenon, and is cooled and solidified, breathability at that part is lost, and a pressure loss is increased. When a melt viscosity exceeds 20,000 centipoises, a separating material having a sufficient height can be obtained, and a pressure loss can be lessened, but a contact area between a separating material comprising a hot melt resin and a fiber sheet becomes small, and there arises a problem that a separating material is peeled from a fiber sheet.

Examples of a method of coating a hot melt resin on a biodegradable electret fiber sheet include a method of crosslinking between pleat apices with a hot melt resin (FIG. 3), and a method of coating a hot melt resin on a biodegradable electret fiber sheet at a constant interval in a beat manner (FIG. 4).

In a method of crosslinking between pleat apices with a hot melt resin, a pleat height is 100 mm or smaller, preferably 60 mm or smaller. In addition, a pleat interval is 2 to 20 mm, preferably 5 to 10 mm. When a pleat interval is less than 2 mm, biodegradable fiber sheets are easily adhered closely with each other. In addition, when the interval is larger than 20 mm, upon crosslinking fixation between apices, a hot melt resin is sagged due to its own weight during solidification, is adhered on not only a pleat apex but also a pleat slope, heating this part. Thus, there is a possibility that deterioration in property of conversion into an electret, and clogging of a biodegradable electret fiber sheet are caused.

In a method (FIG. 5) of coating a hot melt resin 3 on a biodegradable electret fiber sheet 1 at a constant interval d in a beat manner, an interval d between beat-like hot melt resins 3 is preferably 10 to 100 mm, more preferable 20 to 50 mm. When the interval d is less than 10 mm, contact between fiber sheets 1 can be assuredly prevented by a beat-like hot melt resin 3, but a coating area of a hot melt resin 3 occupied in a fiber sheet 1 is increased, and breathability is deteriorated and, as a result, the pressure loss as an air cleaning filter increases remarkably.

On the other hand, when the interval d exceeds 100 mm, adjacent fiber sheets 1 are contacted due to a pressure difference when a fluid passes through a fiber sheet 1 upon use, and pressure loss is increased.

It is more preferable that a hot melt resin 3 is not coated on a region which becomes a valley part 7 upon folding of a fiber sheet 1.

Examples of a biodegradable fiber sheet having higher rigidity than that of a biodegradable electret fiber sheet include biodegradable sheets having breathability such as a non-woven fabric and a net comprising polylactic acid, aliphatic polyester, lactone resin, starch/polyvinyl alcohol, polyhydroxyalkanoate, polyamino acid, or cellulose. It is preferable that a degree of flexible rigidity of a biodegradable fiber sheet is 100 mm or larger in measurement based on JISL1096 "general woven fabric test method", flexible rigidity A method. When the degree is less than 100 mm, there is a possibility that a wrought fiber sheet is deformed due to deficiency in rigidity at a high pressure.

As a method of laminating a biodegradable fiber sheet on a biodegradable electret fiber sheet, it is preferable to use a biodegradable adhesive when an adhesive is used. When a biodegradable sheet has a lower melting point than that of an electret fiber sheet, it is possible to perform lamination by heat treatment without using an adhesive, such as thermal roll, and thermal embossing utilizing a melting point difference.

Examples of a biodegradable frame material for accommodating a wrought fiber sheet include a resin plate and a non-woven fabric comprising a material having higher rigidity than that of a wrought fiber sheet.

Although it is effective that a resin plate for a frame material contains aliphatic polyester as a main component, a material having biodegradability, and having strength and processibility equivalent to those of a resin plate may be used. It is preferable that aliphatic polyester is polylactic acid and/or a thermoplastic resin containing polylactic acid as a main component. As a thermoplastic resin containing polylactic acid as a main component, resins in which lactic acid is copolymerized with one kind or two or more kinds of cyclic lactones such as ϵ-caprolactone, α-oxyacids such as α-hydroxybutyric acid, α-hydroxyisobutyric acid, and α-hydroxyvaleric acid, glycols such as ethylene glycol, and 1,4-butanediol, and dicarboxylic acids such as succinic acid and sebacic acid can be used. As a copolymer, a random copolymer and/or a block copolymer can be used. In addition, it is preferable to esterify an end of a polymer molecule with a compound having a carboxyl group at a molecular end, thereby, stability at thermal molding can be improved.

Polylactic acid is a dehydration polycondensate of lactic acid. Polylactic acid having a high molecular weight is easily obtained via lactide which is a cyclic dimer of lactic acid. In lactic acid, there are L-lactic acid and D-lactic acid which are an optical isomer. It is known that an optical purity or crystallizability of polylactic acid is different depending on a ratio of a L-isomer and a D-isomer present in its molecular structure. Regarding mechanical property, an elastic modulus and an elongation do not have optical purity dependency, but there is a tendency that as an optical purity is lower, a strength is lowered. In addition, as an optical purity is lowered, a rate of biodegradability is increased. As a result of intense study, when polylactic acid in which an optical purity of L-lactic acid and D-lactic acid as an optical isomer is 70% ee or higher was used, a strength equivalent to or larger than that of the previous member using aluminum, a timber or an ABS resin was exhibited. It is more preferable to use polylactic acid in which an optical purity of L-lactic acid and D-lactic acid as an optical isomer is 80% ee or higher. When an optical purity is 70% ee or lower, a strength is smaller than that of the previous aluminum, timber or ABS resin, and function of maintaining a filtering material shape which is originally possessed by a frame material or a member can not be exerted (% ee: % enantiomeric excess).

Since polylactic acid is low in impact resistance and heat resistance, it undergoes limitation in use environment and utility upon merchandization of various molded articles in some cases. As a method for improving impact resistance of polylactic acid, blending of a polyether-bases elastomer, a natural rubber, and styrene butadiene copolymer has been proposed but, from a viewpoint of biodegradability, polybutylene succinate, and polybutylene succinate adipate which are a biodegradable plastic, and is aliphatic polyesther obtained from diol and dicarboxylic acid, are opaque, but are relatively low in an elastic modulus and is excellent in impact resistance. A blend of these and polylactic acid loses transparency, but impact resistance can be improved while utilizing high elasticity of polylactic acid. As a result of intensive study, when a polymer obtained by mixing polylactic acid and polybutylene succinate or polybutylene succinate adipate at a weight ratio of 5:1 to 1:1 is used as a frame material for accommodating a filtering material, or a member for reinforcing a filtering material, a strength equivalent to or higher than that of the previous member using aluminum, an ABS resin or a timber was exhibited. It is more preferable to use a polymer obtained by mixing polylactic acid and polybutylene succinate or polybutylene succinate adipate at a weight ratio of 4:1 to 2:1, as a frame member for accommodating a filtering material, or a member for reinforcing a filtering material. When a weight ratio of polylactic acid is greater than 80%, or smaller than 66%, a strength becomes smaller than that of the previous frame material using aluminum, a timber or an ABS resin, and function of maintaining a shape of a biodegradable electret fiber sheet which is originally possessed by a frame material cannot be exerted.

A thickness of a resin plate for a frame material depends on biodegradable rigidity, but is 0.5 mm or larger, more preferable 1 mm or lager. When the thickness is less than 0.5 mm, a strength is deficient, and there is a possibility that a shape is not sufficiently retained by a frame material.

A resin plate for a frame member is straight or U-shape, and is necessary to be applied on at least two sides or four sides of a wrought fiber sheet. If a rigidity of a wrought fiber sheet is high, only when a frame material is applied,on two sides, a problem is not generated in handling property, and a filter-unit strength and, usually, a frame material is disposed on four sides. In order to apply a resin plate to a wrought fiber sheet, it is preferable to apply it with a biodegradable adhesive.

Examples of a non-woven fabric for a frame material include biodegradable sheets having breathability, such as a non-woven fabric and a net comprising polylactic acid, aliphatic polyesther, lactone resin, starch/polyvinyl alcohol, polyhydroxyalkanoate, polyamino acid or cellulose. A material having a strength and processibility equivalent to those of a resin plate can be also used. However, in the case of a fiber non-woven fabric, there is a possibility that rigidity is low, and rigidity can be increased by coating a biodegradable resin on a fiber non-woven fabric, and drying it. It is preferable that a degree of flexible rigidity of a non-woven fabric usable in a frame material is 200 mm or greater, in measurement based on JISL1096"general woven fabric test method", flexible rigidity A method. When the degree is less than 200 mm, there is a possibility that a wrought fiber sheet is deformed due to deficiency in rigidity at a high wind pressure. In order to apply a non-woven fabric usable in a frame material to a wrought fiber sheet, it is preferable to apply it with a biodegradable adhesive as described above.

Each of a configuration reinforcing member and a frame material has been variously described above, but an example of a method of forming a configuration reinforcing member and a frame material simultaneously includes integration molding by injection molding. A biodegradable electret fiber sheet and a frame material can be integrated by mounting single plate-shaped and pleat-shaped biodegradable electret fiber sheets in a mold, casting a melted resin into a gap part of a mold, and cooling and solidifying it. In this case, an adhesive for connecting both of them becomes unnecessary. Further, by providing a comb-like or straight gap in addition to a frame part instead of the aforementioned configuration reinforcing member, it is possible to mold a configuration reinforcing member simultaneously at preparation of a frame material. Preparation is possible with only a configuration reinforcing member.

First, a filter test method used in the present Example will be shown below.

(Capturing Efficiency)

Adjacent pleats were incorporated at an interval of 5 mm, and an efficiency of capturing a 0.3 μm DOP particle when 56 $m^3$/min of an air passed was obtained based on JIS B 9908 "Ventilation Air Filter Unit", item 8.1.1 "Particle Capturing Test".

(Pressure Loss)

Using the same sample as that for assessment of a capturing efficiency, a pressure loss when 56 $m^3$/min of an air passed was obtained based on JIS B 9908 "Ventilation Air Filter Unit", item 8.1.2 "Pressure Loss Test".

(Biodegradability)

A wrought fiber sheet and an air cleaning filter unit were prepared into 100 mm×100 mm×60 mm, placed into Composter (Law trash treating machine, "MAM" manufactured by Mitsuihome Co., Ltd.), a form of a sample (degree of degradation) was observed with naked eyes after 7 days, and assessment was performed according to the following criteria:

O: An appearance of a sample is completely vanished.

Δ: There is a fragment of a sample.

X: An almost all appearance of a sample remains.

(Resistance to Wind Pressure)

An air cleaning filter unit was mounted in a filter unit assessing apparatus described in JIS B 9908, and deformation of a wrought fiber sheet when an air passed at a wind amount of 56 $m^3$/min was assessed.

BRIEF DESCRIPTION OF THE DRAWINGS

FIG. 1 shows a method of inserting a separator molded into a corrugated shape between pleats.

FIG. 2 shows a method of inserting a stabilizer molded into a comb shape between pleats.

FIG. 3 shows a method of crosslinking between pleat apices with a hot melt resin.

FIG. 4 shows a method of coating a hot melt resin on a biodegradable electret fiber sheet in a beat manner.

FIG. 5 is a schematic view of a method of coating a hot melt resin in a beat manner.

BEST MODE FOR CARRYING OUT THE INVENTION

The present invention will be explained below in more detail by way of Examples, but the following Examples have no nature of limiting the present invention. Design alternation in line of the aforementioned and the later gists is included in the technical scope of the present invention.

EXAMPLE 1

An embossed spun bonded non-woven fabric made of polylactic acid having a fiber diameter of 25 μm, a weight (metsuke) of 40 $g/m^2$, a thickness of 0.35 mm and a melting point of 170° C. was converted into an electret to obtain an electret fiber sheet. The electret fiber sheet was pleat-processed at a pleat width of 60 mm. A wrought fiber sheet was prepared in which a separator processed into a corrugated shape having a thickness of 0.2 mm, comprising polylactic acid in which an optical purity of L-lactic acid and D-lactic acid as an optical isomer was 70% ee, was mounted as a configuration reinforcing member between respective pleats. After, a filter unit frame was a resin frame having a thickness of 2 mm, comprising polylactic acid in which an optical purity of L-lactic acid and D-lactic acid as an optical isomer was 70% ee, and four sides of a wrought fiber sheet were adhered with aliphatic dicarboxylic acid to prepare an air cleaning filter unit.

EXAMPLE 2

The electret fiber sheet of Example 1 was pleat-processed at a pleat width of 60 mm, and a stabilizer processed into a comb-like shape having a thickness of 2 mm, comprising polylactic acid in which an optical purity of L-lactic acid and D-lactic acid as an optical isomer was 70% ee, as a configuration reinforcing member was mounted between respective pleats and on an upstream side and a downstream side in a direction of air flowing at the number of each 10, to prepare a wrought fiber sheet. Thereafter, an air cleaning filter unit was prepared using the filter unit frame of Example 1.

EXAMPLE 3

The electret fiber sheet of Example 1 was pleat-processed at a pleat width of 60 mm, and a hot melt resin of aliphatic dicarboxylic acid having a softening point of 145° C. and a melt viscosity of 5800 CP as a configuration reinforcing member was coated at an interval of 25.4 mm and a coating amount of 1.5 g/m in a beat manner to prepare a wrought fiber sheet. Thereafter, an air cleaning filter unit was prepared using the filter unit frame of Example 1.

EXAMPLE 4

The electret fiber sheet of Example 1 was pleat-processed at a pleat width of 60 mm, and a hot melt resin of aliphatic dicarboxylic acid having a softening point of 145° C. and a melt viscosity of 5800 CP as a configuration reinforcing member was disposed on an upstream side and a downstream side in an air flowing direction at the number of each 10 and at a coating amount of 7 g/m, to prepare a wrought fiber sheet in which a pleat apex was crosslinked. Thereafter, an air cleaning filter unit was prepared using the filter unit frame of Example 1.

EXAMPLE 5

Aliphatic dicarboxylic acid was adhered at 20 $g/m^2$ on an embossed spun bonded non-woven fabric made of polylactic acid having a fiber diameter of 30 μm, a weight of 60 $g/m^2$, a thickness of 0.4 mm and a melting point of 170° C. as a configuration reinforcing member, followed by drying and solidification. Flexible rigidity of this configuration reinforcing member was 150 mm. This configuration reinforcing member and the electret fiber sheet of Example 1 was laminated by embossing procession to obtain a wrought electret fiber sheet. The electret fiber sheet was pleat-processed at a pleat width of 60 mm to prepare a wrought fiber sheet. Thereafter, an air cleaning filter unit was prepared using the filter unit frame of Example 1.

EXAMPLE 6

Aliphatic dicarboxylic acid was adhered at 20 $g/m^2$ on an embossed spun bonded non-woven fabric made of polylactic acid having a fiber diameter of 30 μm, a weight of 110 $g/m^2$, a thickness of 0.7 mm and a melding point of 170° C. as a frame material having a non-woven fabric shape, followed by drying and solidification. Flexible rigidity of this frame material was 220 mm. On four sides of the wrought fiber sheet of Example 2, a frame material having a non-woven fabric shape was adhered with aliphatic dicarboxylic acid to prepare an air cleaning filter unit.

EXAMPLE 7

The wrought fiber sheet of Example 5 was pleat-processed at a pleat width of 60 mm, and mounted in a mold for injection molding. Thereafter, polylactic acid in which an optical purity of L-lactic acid and D-lactic acid as an optical isomer was 70% ee was melted, a gap was disposed with a configuration reinforcing member having a thickness of 2 mm and having a frame thickness of 2 mm so that each 10 of comb shapes were formed on an upstream side and on a downstream side in an air flowing direction, and the melted resin was cast into the gap part, followed by cooling and solidification, and to prepare an air cleaning filter unit by integration molding. A wrought fiber sheet was prepared by injection-molding a resin only on a configuration reinforcing member.

COMPARATIVE EXAMPLE 1

An embossed spun bonded non-woven fabric made of polypropylene having a fiber diameter of 25 μm, a weight of 40 g/m$^2$, a thickness of 0.35 mm and a melting point of 165° C. was converted into an electret, to obtain an electret fiber sheet. The electret fiber sheet was pleat-processed at a pleat width of 60 mm. A hot melt resin of an ethylene vinyl acetate copolymer having a softening point of 107° C. and a melt viscosity of 3400 CP was coated at an interval of 25.4 mm and a coating amount of 1.5 g/m to prepare a wrought fiber sheet.

Thereafter, a filter unit frame was a resin frame comprising an ABS resin and having a thickness of 2 mm, and four sides of the wrought fiber sheet were adhered with polyethylene to prepare an air cleaning filter unit.

COMPARATIVE EXAMPLE 2

The same wrought fiber sheet and air cleaning filter unit as those of Example 1 were prepared except that a thickness of the configuration reinforcing member of Example 1 was 0.05 mm.

COMPARATIVE EXAMPLE 3

The same wrought fiber sheet and air cleaning filter unit as those of Example 2 were prepare except that a thickness of the configuration reinforcing member of Example 2 was 0.05 mm.

COMPARATIVE EXAMPLE 4

The same wrought fiber sheet and air cleaning filter unit as those of Example 3 were prepared except that a hot melt resin interval of the configuration reinforcing member of Example 3 was 110 mm, and a coating amount was 12 g/m.

COMPARATIVE EXAMPLE 5

The same wrought fiber sheet and air cleaning filter unit as those of Example 4 were prepared except that a coating amount of a hot melt resin for a configuration reinforcing member of Example 4 was 12 g/m.

COMPARATIVE EXAMPLE 6

Aliphatic dicarboxylic acid was adhered at 2 g/m$^2$ on an embossed spun bonded non-woven fabric made of polylactic acid having a fiber diameter of 30 μm, a weight of 20 g/m$^2$, a thickness of 0.15 mm and a melting point of 170° C. as a configuration reinforcing member, followed by drying and solidification. Flexible rigidity of this configuration reinforcing member was 70 mm. This configuration reinforcing member and the electret fiber sheet of Example 1 were laminated by embossing processing to obtain a wrought electret fiber sheet. The electret fiber sheet was pleat-processed at a pleat width of 60 mm.

Thereafter, an air cleaning filter unit was prepared using the filter unit frame of Example 1.

COMPARATIVE EXAMPLE 7

Aliphatic dicarboxylic acid was adhered at 20 g/m$^2$ on an embossed spun bonded non-woven fabric made of polylactic acid having a fiber diameter of 30 μm, a weight of 60 g/m$^2$, a thickness of 0.4 mm and a melting point of 170° C. as a frame material having a non-woven fabric shape, followed by drying and solidification. Flexible rigidity of this configuration reinforcing member was 150 mm. On four sides of the wrought fiber sheet of Example 1, a flame material having a non-woven fabric shape was adhered with aliphatic dicarboxylic acid to prepare an air cleaning filter unit.

COMPARATIVE EXAMPLE 8

The same wrought fiber sheet and air cleaning filter unit as those of Example 7 were prepared except that the resin for injection molding of Example 7 was an ABS resin.

COMPARATIVE EXAMPLE 9

A filter unit frame for the wrought fiber sheet of Example 2 was a resin frame comprising an ABS resin and having a thickness of 2 mm, and four sides of the wrought fiber sheet were adhered with polyethylene to prepare an air cleaning filter unit.

The aforementioned filters were measured for appearance, as well as a capturing efficiency, a pressure loss, and resistance to wind pressure by the above-explained method. The results are shown in Table 1 and Table 2.

TABLE 1

| | Appearance | Resistance to wind pressure |
|---|---|---|
| Example 1 | Better | Better |
| Example 2 | Better | Better |
| Example 3 | Better | Better |
| Example 4 | Better | Better |
| Example 5 | Better | Better |
| Example 6 | Better | Better |
| Example 7 | Better | Better |
| Comparative Example 1 | Better | Better |
| Comparative Example 2 | Better | Adjacent pleats were contacted. A configuration |

TABLE 1-continued

| | Appearance | Resistance to wind pressure |
|---|---|---|
| | | reinforcing member were pulled towards a downstream side. |
| Comparative Example 3 | Better | Adjacent pleats were contacted. A configuration reinforcing member were pulled towards a downstream side. |
| Comparative Example 4 | A fiber sheet was partially melted. | — |
| Comparative Example 5 | A fiber sheet was partially melted. | — |
| Comparative Example 6 | Better | Adjacent pleats were contacted. |
| Comparative Example 7 | Better | Adjacent pleats were contacted. |
| Comparative Example 8 | Better | Better |
| Comparative Example 9 | Better | Better |

TABLE 2

| | | | Biodegradability | | |
|---|---|---|---|---|---|
| | Capturing efficiency (%) | Pressure loss (mmAq) | Wrought fiber sheet | Air cleaning filter unit | Determination |
| Example 1 | 60 | 15.6 | ○ | ○ | ○ |
| Example 2 | 54 | 12.6 | ○ | ○ | ○ |
| Example 3 | 56 | 12.5 | ○ | ○ | ○ |
| Example 4 | 55 | 12.2 | ○ | ○ | ○ |
| Example 5 | 55 | 14.2 | ○ | ○ | ○ |
| Example 6 | 54 | 12.4 | ○ | ○ | ○ |
| Example 7 | 56 | 13.4 | ○ | ○ | ○ |
| Comparative Example 1 | 56 | 12.5 | X | X | X |
| Comparative Example 2 | 48 | 29.6 | ○ | ○ | X |
| Comparative Example 3 | 43 | 24.3 | ○ | ○ | X |
| Comparative Example 4 | — | — | — | — | X |
| Comparative Example 5 | — | — | — | — | X |
| Comparative Example 6 | 56 | 20.3 | ○ | ○ | X |
| Comparative Example 7 | 55 | 17.8 | ○ | ○ | X |
| Comparative Example 8 | 55 | 13.4 | Δ | Δ | X |
| Comparative Example 9 | 55 | 12.4 | ○ | Δ | X |

INDUSTRIAL APPLICABILITY

According to the present invention, it becomes possible to provide a wrought fiber sheet, or air cleaning filter unit, in which a non-woven sheet only does not have biodegradability, and which has high performance (low pressure loss, high dust removing performance), and biodegradability, and has low load on the environment, in such a form that a user actually uses in air cleaning utility.

The invention claimed is:

1. A wrought fiber sheet, comprising:

a configuration reinforcing member comprising a biodegradable material; and a biodegradable electret fiber sheet coupled with the configuration reinforcing member, wherein the configuration reinforcing member includes a resin plate comprising a polylactic acid that has an L-lactic acid and a D-lactic acid as optical isomers and that has an optical purity of 70% ee or higher.

2. The wrought fiber sheet according to claim 1, wherein the biodegradable electret fiber sheet has a pleated shape, the resin plate of the configuration reinforcing member has a corrugated shape or a comb shape and the resin plate is disposed in between pleats of the biodegradable electret fiber sheet as a separator.

3. A wrought fiber sheet, comprising:

a configuration reinforcing member comprising a biodegradable material; and a biodegradable electret fiber sheet coupled with the configuration reinforcing member, wherein the configuration reinforcing member comprises a hot melt resin, the hot melt resin having a softening point that is 90° C. or higher as measured in accordance with JIS-K-6863, and the softening point of the hot melt resin being lower than a melting point of the fiber sheet by 10° C. or more.

4. The wrought fiber sheet according to claim 1 or 3, wherein the biodegradable electret fiber sheet comprises an aliphatic polyester as a main component.

5. An air cleaning filter unit, comprising:

a wrought fiber sheet obtained by coupling a biodegradable electret fiber sheet with a configuration reinforcing member, the configuration reinforcing member comprising a biodegradable material integrated with a biodegradable frame material for accommodating the sheet, wherein the configuration reinforcing member comprises a resin plate, the resin plate comprising a polylactic acid that has an L-lactic acid and a D-lactic acid as optical isomers and that has an optical purity of 70% ee or higher.

6. The air cleaning filter unit according to claim 5, wherein the biodegradable electret fiber sheet has a pleated shape, the resin plate has a corrugated shape or a comb shape, and the resin plate is disposed in between pleats of the biodegradable electret fiber sheet as a separator.

7. An air cleaning filter unit, comprising:

a wrought fiber sheet obtained by coupling a biodegradable electret fiber sheet with a configuration reinforcing member, the configuration reinforcing member comprising a biodegradable material integrated with a biodegradable frame material accommodating the sheet, wherein the configuration reinforcing member comprises a hot melt resin having a softening point that is 90° C. or higher as measured in accordance with JIS-K-6863, and the softening point being lower than a melting point of the fiber sheet by 10° C. or more.

8. The air cleaning filter unit according to claim 5 or 7, wherein the biodegradable electret fiber sheet is a fiber sheet containing an aliphatic polyester as a main component.

9. The air cleaning filter unit according to claim 5 or 7, wherein the frame material for accommodating the biodegradable electret fiber sheet comprises at least two sides and has higher rigidity than the rigidity of the biodegradable electret fiber sheet, and the frame material is a resin plate or a non-woven fabric.

10. The air cleaning filter unit according to claim 5 or 7, wherein the frame material for the configuration reinforcing member comprises a polylactic acid that has a L-lactic acid and a D-lactic acid as optical isomers and that has an optical purity of 70% ee or higher.

11. The air cleaning filter unit according to claim 10, wherein the frame material comprises a polymer obtained by mixing a polylactic acid and a polybutylene succinate or a polybutylene succinate adipate at a weight ratio of 5:1 to 1:1.

* * * * *